(No Model.) 2 Sheets—Sheet 1.
R. BEAN & A. W. GRANT.
COMBINED CLIP IRON AND BRACE FOR CARRIAGES.
No. 350,103. Patented Oct. 5, 1886.
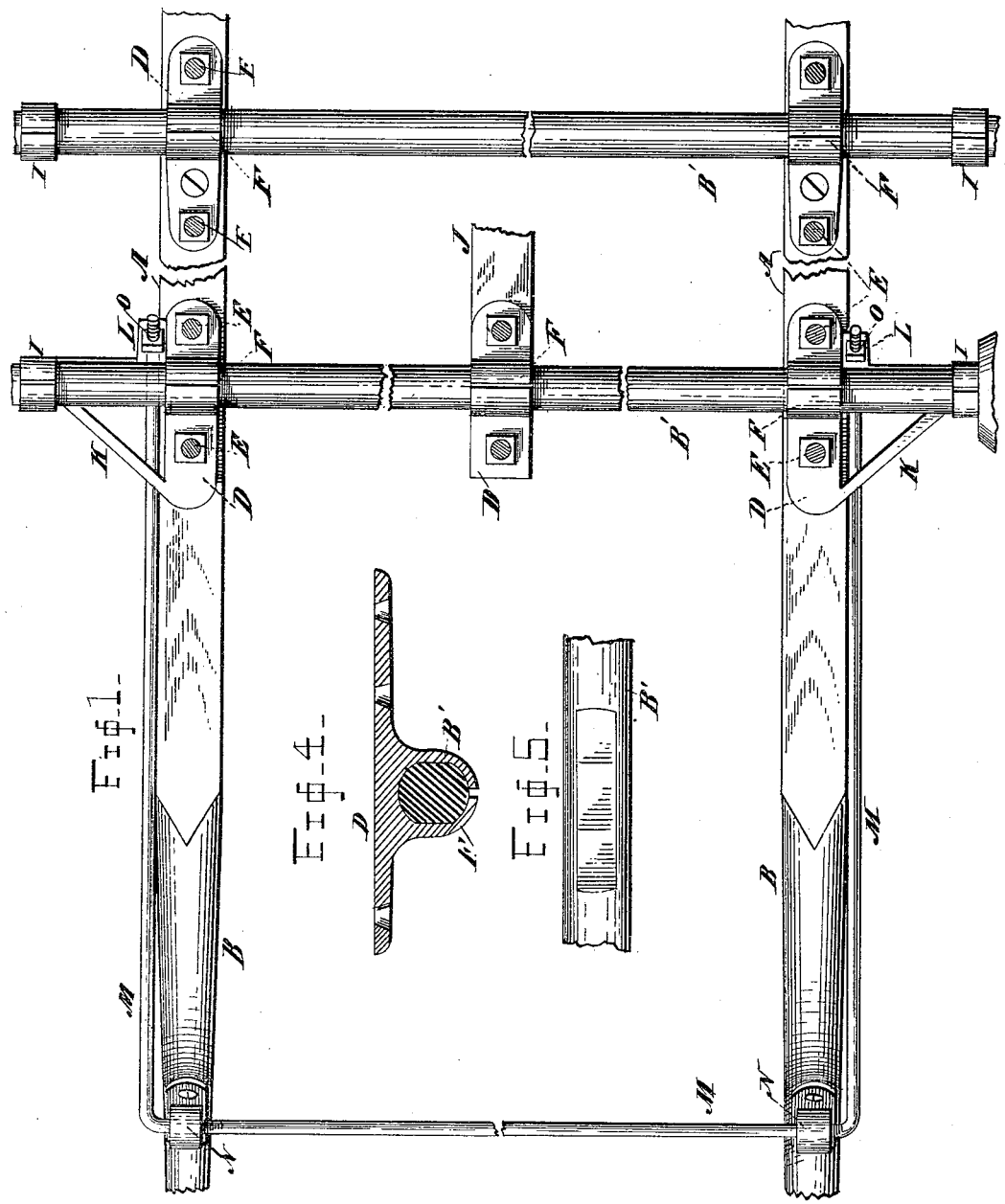
WITNESSES
INVENTOR
Roscoe Bean and
Arthur W. Grant,
By Toulmin & Gemmes,
Attorneys.

(No Model.) 2 Sheets—Sheet 2.
R. BEAN & A. W. GRANT.
COMBINED CLIP IRON AND BRACE FOR CARRIAGES.
No. 350,103. Patented Oct. 5, 1886.
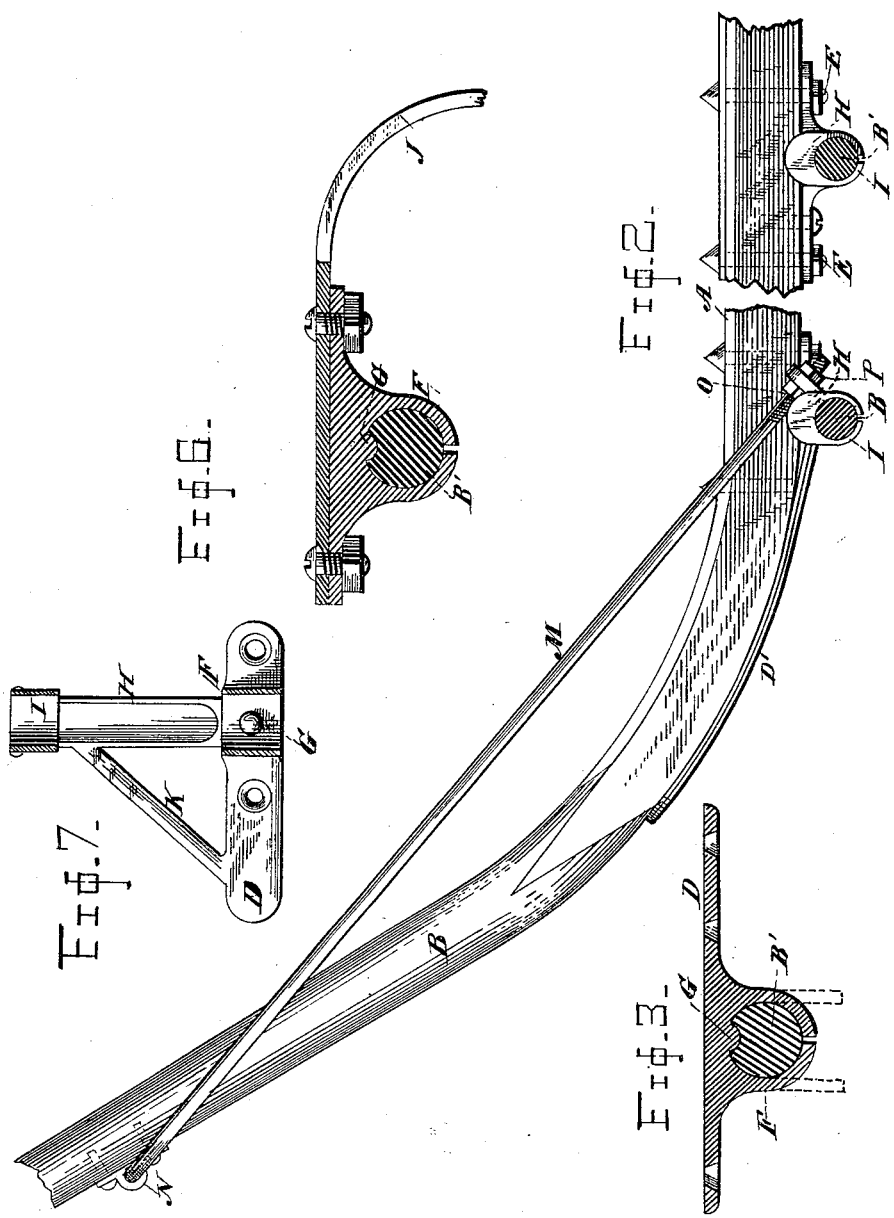
WITNESSES
INVENTOR
Roscoe Bean and
Arthur W. Grant
Attorneys.

UNITED STATES PATENT OFFICE.

ROSCOE BEAN AND ARTHUR W. GRANT, OF SPRINGFIELD, OHIO, ASSIGNORS TO THE TRICYCLE MANUFACTURING COMPANY, OF SAME PLACE.

COMBINED CLIP-IRON AND BRACE FOR CARRIAGES.

SPECIFICATION forming part of Letters Patent No. 350,103, dated October 5, 1886.

Application filed April 2, 1886. Serial No. 197,510. (No model.)

*To all whom it may concern:*

Be it known that we, ROSCOE BEAN and ARTHUR W. GRANT, citizens of the United States, residing at Springfield, in the county of Clark and State of Ohio, have invented certain new and useful Improvements in Combined Clip-Irons and Braces for Children's Carriages, of which the following is a specification, reference being had therein to the accompanying drawings.

This invention relates to certain new and useful improvements in combined clip-irons and handle-braces for children's carriages; and it has for its objects, first, to provide clip-irons of such construction that they will serve to connect the axles to the reach-bars of the carriages without forming holes through the axles, and in such manner that the axles shall be prevented from turning, and this whether the axles be round or of angular form in cross-section either throughout their entire length or at the point of contact with the clips, special reference, however, being had to securing round axles, as axles of this shape can be manufactured at less cost and of sufficient size to afford the requisite strength with less consumption of metal; second, to provide the clip-irons with a lateral projection of such construction at the outer end as to afford a convenient shoulder for the inner face of the hub of the wheel to fit against, whereby the expense and necessity of the usual shoulder or collar-like abutment on the axle to prevent the wheel from shifting inwardly are entirely avoided; and, third, to provide a brace which shall connect with the rear axle by means of the rear clip-irons or otherwise, and with the handles proper a sufficient distance from the axle to afford a means of support and strength to the handles, and enable them to withstand longer and more violent usage.

In the accompanying drawings, forming a part of this specification, and on which like reference-letters indicate corresponding parts, Figure 1 represents an inverted plan of the reach-bars, showing a portion of the handles proper, the axles, and the clip-irons and brace secured in their several places; Fig. 2, a side elevation of the same, showing the axle in cross-section; Fig. 3, a longitudinal vertical sectional view of one of the clip-irons and a transverse sectional view of an axle, showing the manner of securing it and preventing it from revolving; Fig. 4, a longitudinal cross-sectional view of the clip-iron with an axle in cross-section, showing a modified manner of holding a modified form of axle; Fig. 5, a side view of a portion of the axle; Fig. 6, a transverse sectional view of the rear axle and a longitudinal sectional view of a spring-clip having a portion of a spring secured thereto, and Fig. 7 a plan view of a clip alone.

The letter A designates the reach-bars of the carriage, which are of the usual form and are constructed of wood, and terminate at their rear ends in the upwardly curved and extended handles B. To these bars, at the points where the axles B' are located, are secured the clip-irons, consisting of the plates D, having several apertures for the passage of the bolts E, by which they are held to the bars. In the lower side of the plates are formed the projecting wings F, which, before they are made to embrace the axles, stand out at about right angles thereto, as seen in dotted lines, Fig. 3. From the plates and between the wings also project the short studs G, each plate having one stud. The clip entire is made of malleable iron, and the wings are thus rendered capable of being bent round and made to embrace the axle, as shown in the several figures, and of holding the same, while the axle itself is provided with an indentation, into which the stud G extends, whereby the axle is precluded from the possibility of revolving. The advantage of this simple and effective construction will at once appear, for it will be observed that the operation of boring bolt-holes in the axle to secure it, which is expensive in the manufacture and weakening to the axle itself, is avoided. The indentations in the axles being accomplished in a moment by a punch or similar tool, and being slight in depth, no resulting reduction in the strength of the axles is brought about. Again, by means of this construction, the axles may be made from bars of round iron in the condition in which they come into the market from the rolling-mills, and without any finishing or handling, which considerably reduces the cost at which the carriages can be sold to the public. Furthermore, as already observed, the axles can be made less weighty of round than of square form in cross-section, and yet the requisite strength preserved. The cost of production is lessened, too, by using the round iron and reducing the weight. The clips are further provided with laterally-extending arms, H, whose outer ends terminate in similar wings, I, the principal function of which, however, is to hold that end of the arms snugly to the axles, and to afford a shoulder for the inner ends of the wheel-hubs, the axles being essentially held by the means already described. Here, again, a very considerable advantage and reduction of cost are secured, since the turning or otherwise forming of the usual spindles and shoulders of the square axles is rendered entirely unnecessary.

The description so far given applies equally to the forward and rear clips, as also to the clip shown in Fig. 6, (save with respect to the lateral arm and its wings,) the office of which latter clip is to secure a spring, J, to the rear axle for supporting the rear end of the carriage-body. The clips used upon the rear axle for securing it to the reach-bars are by preference additionally provided with the oblique bars K, which serve to more firmly sustain or brace the axle near the hubs from back and forward vibration or springing. These rear clips also have constructed integrally with them the lugs L, projecting in a forward and upward direction, and having each a hole or open slot, into which fits the respective lower and forward ends of the wire brace-rod M, a thread being formed on either end to receive nuts O and P, to secure the brace. This rod extends from these lugs up along the respective handles, across the curvature thereof, and preferably to a point somewhat above that curvature, where it extends from one to the other of the handles, and is secured to each by eye-plates N, or otherwise. By this simple means the handles are afforded a strong brace and the liability to frequent breakage avoided, while rigidity is also imparted to the general structure. Besides, the nuts are used to adjust the handles relatively to the body, so as to set both the same distance from the body and in line with each other. In this respect they form an important function, and they also hold the brace against moving in the lugs in either direction.

In the modification shown in Fig. 4 the stud G is omitted, and instead of that expedient to prevent the turning of the axle the latter during the manufacture is struck a sufficiently heavy blow to flatten two of its opposite sides. These flattened sides are then embraced by the wings, as shown.

In Fig. 5 a portion of an axle with a flattened surface is illustrated.

In Fig. 2 the plate D is somewhat elongated, as at D', and is thus made to act as a brace in itself for the handles. This construction may or may not be used, and may be used conjointly or separately from the brace-rod M.

Having thus fully described our invention, what we claim as new, and desire to secure by Letters Patent, is—

1. In a child's carriage, the combination, with the reach-bars thereof and a round axle, of the clip-iron consisting of a plate constructed with wings which are bent around the axle and embrace and bind it and prevent its turning.

2. In a child's carriage, the combination, with the reach-bars and the practically round axle having an indentation, of the clip-iron consisting of the plate having a stud and projecting wings which respectively engage the indentation and embrace and bind the axle.

3. In a child's carriage, the combination, with the reach-bars and handles, and the axle, of the clip-irons consisting of a plate having projecting wings which embrace and bind the axle, and having lugs and a brace-rod connected to the clips and to the handles.

4. In a child's carriage, the combination, with the handles and clips secured thereto, of the brace-rod secured to the clips and to the handles, and extended across the curvature and along the sides of the handles.

5. In a child's carriage, the brace-rod constructed of a single piece of wire or rod, and with a cross portion and side portions.

6. In a child's carriage, the combination, with the reach-bars thereof and the axle, of the clip-iron consisting of a plate having wings which embrace and bind the axles, and a lateral arm which serves as a shoulder for the wheel-hub, and which is provided with wings which embrace the axle.

7. In a child's carriage, the combination, with the reach-bars thereof and the practically round axle having an indentation, of the clip-iron consisting of a plate having a stud and wings which respectively engage the indentation and embrace and bind the axle, and having a lateral arm which serves as a shoulder for the wheel-hub, and which also has wings which bind the axle.

8. In a child's carriage, a clip-iron consisting of a plate having projecting wings and a stud, and having a lateral arm provided with wings.

9. In a child's carriage, a clip-iron consisting of a plate having a stud and projecting wings, and having a lateral arm whose outer end terminates in wings, and an oblique bar connecting the plate with the lateral arm.

10. In a child's carriage, the combination, with the handle, the reach-bars, and a round axle, of a plate elongated to form a brace and adapted to support the handle, and having wings which are bent around the axle and embrace and bind it and prevent its turning.

11. In a child's carriage, a clip-iron consisting of a plate elongated to form a brace and adapted to support the carriage-handle, and having a projecting stud and wings, the stud to engage an indentation in the axle, and the wings to embrace and bind the axle.

12. In a child's carriage, the combination, with the handles, of the clips secured thereto, and having wings which embrace and bind the axle, and lugs for the brace-rods, and the brace-rod secured to the handles, and having threaded ends which extend through the lugs and nuts placed one on each side of each lug.

13. In a child's carriage, the combination, with clips having lugs, of a brace-rod having threaded ends extending through the lugs and nuts placed one on each side of each lug.

In testimony whereof we affix our signatures in presence of two witnesses.

ROSCOE BEAN.
ARTHUR W. GRANT.

Witnesses:
D. G. JEFFERIES,
CHASE STEWART.